(12) United States Patent
Hager et al.

(10) Patent No.: US 10,125,940 B2
(45) Date of Patent: Nov. 13, 2018

(54) ILLUMINATION DEVICE

(71) Applicant: OSRAM GmbH, Munich (DE)

(72) Inventors: Juergen Hager, Herbrechtingen (DE); Philipp Helbig, Heidenheim (DE); Stephan Schwaiger, Ulm (DE); Jasmin Muster, Heidenheim (DE)

(73) Assignee: OSRAM GmbH, Munich (DE)

( * ) Notice: Subject to any disclaimer, the term of this patent is extended or adjusted under 35 U.S.C. 154(b) by 0 days.

(21) Appl. No.: 15/315,759

(22) PCT Filed: May 13, 2015

(86) PCT No.: PCT/EP2015/060627
§ 371 (c)(1),
(2) Date: Dec. 2, 2016

(87) PCT Pub. No.: WO2015/185339
PCT Pub. Date: Dec. 10, 2015

(65) Prior Publication Data
US 2017/0097132 A1   Apr. 6, 2017

(30) Foreign Application Priority Data
Jun. 3, 2014  (DE) ........................ 10 2014 210 497

(51) Int. Cl.
F21V 14/06      (2006.01)
F21S 41/63      (2018.01)
(Continued)

(52) U.S. Cl.
CPC .......... *F21S 41/635* (2018.01); *B60Q 1/0088* (2013.01); *B60Q 1/14* (2013.01);
(Continued)

(58) Field of Classification Search
CPC ... F21S 48/1721; F21S 48/115; B60Q 1/0088; B60Q 1/14; F21V 14/06; F21Y 2105/10; F21Y 2115/10
See application file for complete search history.

(56) References Cited

U.S. PATENT DOCUMENTS 8,708,537 B2 * 4/2014 Takahashi ............ F21S 48/1145
                                                         362/259
8,733,996 B2 * 5/2014 Kishimoto ........... B60Q 1/0011
                                                         362/553
(Continued)

FOREIGN PATENT DOCUMENTS

DE    10005795 C2    6/2003
DE    10321564 A1    12/2004
(Continued)

OTHER PUBLICATIONS

German Search Report based on application No. 10 2014 210 497.1 (7 pages) dated Feb. 3, 2014 (for reference purpose only).
(Continued)

Primary Examiner — Peggy Neils
(74) Attorney, Agent, or Firm — Viering, Jentschura & Partner mbB

(57) ABSTRACT

Various embodiments may relate to an illumination device for vehicles, including multiple semiconductor light sources, and at least one light wavelength conversion element for the wavelength conversion of the light emitted by the semiconductor sources. At least one light-refracting optical unit is associated with each semiconductor source, which is designed to direct light emitted by the respective semiconductor source onto the at least one light wavelength conversion element. The at least one light-refracting optical unit is movably arranged with respect to the semiconductor source with which it is associated.

5 Claims, 7 Drawing Sheets

(51) Int. Cl.
  *F21S 41/141* (2018.01)
  *F21S 41/17* (2018.01)
  *B60Q 1/00* (2006.01)
  *B60Q 1/14* (2006.01)
  *F21Y 113/00* (2016.01)
  *F21Y 105/10* (2016.01)
  *F21Y 115/10* (2016.01)

(52) U.S. Cl.
  CPC ............ *F21S 41/141* (2018.01); *F21S 41/17* (2018.01); *F21V 14/06* (2013.01); *B60Q 2300/40* (2013.01); *F21Y 2105/10* (2016.08); *F21Y 2113/00* (2013.01); *F21Y 2115/10* (2016.08)

(56) References Cited

U.S. PATENT DOCUMENTS

| | | | | |
|---|---|---|---|---|
| 9,423,105 | B2* | 8/2016 | Van Bommel | F21V 14/00 |
| 9,732,942 | B2* | 8/2017 | Jorgensen | F21V 14/00 |
| 2006/0139918 | A1* | 6/2006 | Dolgin | G02B 3/00 362/232 |
| 2013/0258689 | A1 | 10/2013 | Takahira et al. | |
| 2014/0029279 | A1 | 1/2014 | Suckling et al. | |
| 2014/0177253 | A1 | 6/2014 | Weissenberger et al. | |

FOREIGN PATENT DOCUMENTS

| | | |
|---|---|---|
| DE | 102004020493 A1 | 11/2005 |
| DE | 102009054101 A1 | 6/2010 |
| DE | 102010062463 A1 | 6/2012 |
| DE | 102012224345 A1 | 6/2014 |
| EP | 2199664 A1 | 6/2010 |
| GB | 2497949 A | 7/2013 |
| WO | 2010006614 A1 | 1/2010 |
| WO | 2012171333 A1 | 12/2012 |

OTHER PUBLICATIONS

International Search Report based on application No. PCT/EP2015/060627 (10 pages + 3 pages English translation) dated Sep. 17, 2015 (for reference purpose).

* cited by examiner

4

4

|   |   |   |   |   |   |   |
|---|---|---|---|---|---|---|
| A | A | B | B | B | A | A |
| B | A | B | B | B | B | B |
| B | A | C | C | C | B | B |
|   | A | B | B | B | B |   |
|   |   |   | A |   |   |   |
|   |   |   |   |   |   |   |

| A | A | A | A |   |   |   |
|---|---|---|---|---|---|---|
| B |   | B | B | A |   |   |
| B |   | B | B | A | A |   |
| B | B | C | C | B | B | B |
| A | B | B | B | A | A |   |
|   | A | A | A |   |   |   |
|   | A | A |   |   |   |   |

ILLUMINATION DEVICE

RELATED APPLICATIONS

The present application is a national stage entry according to 35 U.S.C. § 371 of PCT application No.: PCT/EP2015/060627 filed on May 13, 2015, which claims priority from German application No.: 10 2014 210 497.1 filed on Jun. 3, 2014, and is incorporated herein by reference in its entirety.

TECHNICAL FIELD

Various embodiments generally relate to an illumination device.

BACKGROUND

Such an illumination device is, for example, disclosed in Unexamined Patent Application DE 10 2010 062 463 A1. This document describes an illumination device for vehicles having two semiconductor light sources whose light is directed onto a light wavelength conversion element in each case, and a reflector which reflects light emitted by the light wavelength conversion elements onto the road.

SUMMARY

Various embodiments provide a generic illumination device which makes it possible to generate a desired light distribution on an intermediate level defined by the light wavelength conversion element, and additionally to adjust the light distribution to changes in the traffic situation.

The illumination device according to the present disclosure has multiple semiconductor sources and at least one light wavelength conversion element for the wavelength conversion of the light emitted by the semiconductor sources. According to the present disclosure, at least one light-refracting optical unit is associated with each semiconductor source, which is designed to direct light emitted by the respective semiconductor source onto the at least one light wavelength conversion element, wherein at least one light-refracting optical unit is arranged movably with respect to the semiconductor source with which it is associated.

As a result, a variable light distribution which is adjusted to the traffic situation may be generated on a surface of the at least one light wavelength conversion element. The at least one light-refracting optical unit allows beam formation of the light emitted by the respective semiconductor source, and in particular also focusing of the light emitted by the respective semiconductor source onto a surface of the at least one light wavelength conversion element. In this case, the light emitted by the semiconductor sources may be directed onto identical or different or overlapping surface sections of the at least one light wavelength conversion element by means of the at least one light-refracting and movable optical unit, in order to generate the desired light distribution. In particular, the illumination device according to the present disclosure also enables illumination of the same section of the at least one light wavelength conversion element with light which is emitted by multiple semiconductor sources, in that light from multiple semiconductor sources is directed onto the same surface section of the at least one light wavelength conversion element with the aid of the at least one movable optical unit. As a result, for example, illumination of a surface section of the at least one light wavelength conversion element having constant light intensity may be achieved if the semiconductor sources must be operated at reduced power due to high thermal loading.

The semiconductor sources of the illumination device according to the present disclosure are preferably designed as laser diodes in order to be able to ensure light having high luminance, as is required for application in vehicle headlights.

The at least one light wavelength conversion element of the illumination device according to the present disclosure is preferably designed as a phosphor element which converts at least a portion of the light emitted by the semiconductor sources into light having a different wavelength, so that light converted by the phosphor element and non-converted light are radiated. Preferably, the phosphor composition of the phosphor element is matched to the wavelength of the light emitted by the semiconductor sources in such a way that the mixture of light converted at the phosphor and non-converted light produces white light which meets the legal requirements for white light in vehicle headlights. However, it is also possible to design the light wavelength conversion element in such a way that the total emitted light of the semiconductor sources is converted into light having a different wavelength.

For the aforementioned reasons, the semiconductor sources of the illumination device according to the present disclosure are preferably designed as laser diodes which emit blue light during their operation having a peak wavelength from the wavelength range of 430 nanometers to 470 nanometers, i.e., the light emitted by the laser diodes has a maximum intensity in the aforementioned wavelength range. The at least one light wavelength conversion element of the illumination device according to the present disclosure preferably contains cerium-doped yttrium aluminum garnet YAG:Ce as a phosphor, which converts the blue light emitted by the laser diodes proportionately into yellow light having a maximum intensity in the wavelength range of 500 to 600 nanometers, so that the at least one light wavelength conversion element radiates white light which is a mixture of non-converted blue light and converted yellow light.

Advantageously, the at least one light-refracting optical unit of the illumination device according to the present disclosure is designed to be pivotable or slidable or rotatable, or pivotable and slidable, or pivotable and rotatable, or slidable and rotatable, or pivotable and slidable and rotatable. With the aid of a pivotable design of the at least one light-refracting optical unit, it may be simply achieved that different areas of the at least one light wavelength conversion element, and in particular different surface sections of the at least one light wavelength conversion element, are illuminated with light which was emitted by the respective semiconductor source. A slidable arrangement of the at least one light-refracting optical unit with respect to the semiconductor source associated with it enables a relative spatial orientation of a light-refracting optical unit and the semiconductor source associated with it. Sliding, in the form of a change in the spacing between the at least one light-refracting optical unit and the semiconductor source associated with it, enables in particular an enlargement or reduction of the light spot generated on the at least one light wavelength conversion element. The direction of polarization of the laser beam or the orientation of the so-called fast axis of the laser beam may be changed via rotation of the at least one light-refracting optical unit about an optical axis.

The semiconductor sources of the illumination device according to the present disclosure are advantageously arranged on a common carrier. As a result, they may be produced in a common production process, and the common carrier may also be designed as a heat sink for the semiconductor sources, and populated with electrical components of an operating device for the semiconductor sources. In addition, the common carrier for the semiconductor light sources ensures a fixed arrangement of the semiconductor sources with respect to one other.

Preferably, the at least one light-refracting optical unit is arranged on the common carrier for the semiconductor sources. As a result, the at least one light-refracting optical unit may be oriented and attached in a simple manner with respect to the semiconductor source associated with it. In addition, as a result, the semiconductor sources and the at least one light-refracting optical unit may be designed as a prefabricated module of the illumination device according to the present disclosure.

Advantageously, the illumination device has a movement device which includes at least one piezoelectric element for moving the at least one light-refracting optical unit. As a result, movement of the at least one light-refracting optical unit with respect to the semiconductor sources may be made possible in a simple manner. Preferably, at least three piezoelectric elements are provided in order to design the at least one light-refracting optical unit to be both slidable and pivotable. In particular, at least three piezoelectric elements enable both a translation of the at least one light-refracting optical unit parallel to a surface of the carrier, on which the semiconductor sources are arranged, and a translation perpendicular to this surface, i.e., a change of the spacing between the at least one light-refracting optical unit and the semiconductor sources. In addition, at least three piezoelectric elements also enable a pivoting movement of the at least one light-refracting optical unit about two pivot axes running parallel to the aforementioned surface of the carrier, which are defined by the position of the at least three piezoelectric elements on the carrier. In addition, other piezoelectric elements may be provided for rotating the at least one light-refracting optical unit about its optical axis, in order, for example, to change the direction of polarization of the laser light, or in order to change the orientation of the so-called fast axis of the laser light. For this purpose, the at least one movable optical unit may be designed asymmetrically with respect to rotation about its optical axis.

The illumination device according to the present disclosure preferably includes an operating device for operating the semiconductor sources. The operating device generates the electric currents and voltages required for operating the semiconductor sources from the supply voltage, in particular the vehicle electrical system voltage of a motor vehicle. As a result, no external operating device is required for the illumination device. The operating device of the illumination device according to the present disclosure is preferably designed in such a way that it enables brightness control of the individual semiconductor sources, for example, via amplitude modulation, or pulse width modulation, or a combination of amplitude modulation and pulse width modulation, of the semiconductor source current, in order to provide an additional option for varying the light distribution, and in addition, to be able to reduce the electric power and thus the brightness of the semiconductor sources in the case of heavy thermal loading of the illumination device. In particular, the operating device may also communicate with a higher-level electronic unit which acts as a master for the operating device and receives the required light distribution, for example, from an even higher-level vehicle electronic unit. The higher-level electronic unit assumes the time coordination of the light sources and their movable optical units in order to achieve the desired light distribution. The control electronics for the movable optical unit may be completely integrated into the higher-level electronics unit or may also be partially or completely relocated to a separate unit.

Preferably, the illumination device according to the present disclosure includes a control unit for the aforementioned movement device, by means of which the translation, or the pivoting movement, or the rotation, or a combination of the aforementioned movements of the at least one light-refracting optical unit, is controlled. In particular, the control unit is designed in such a way that it assumes control of these piezoelectric elements in the case of the use of the aforementioned piezoelectric elements. The control unit enables control of the state of movement of the at least one light-refracting optical unit, as a function of the state of illumination of the semiconductor sources of the illumination device according to the present disclosure. The desired state of illumination of the semiconductor sources may result from a camera-based image analysis of the traffic situation. In this case, the image rate may be several hundred hertz or greater.

The illumination device according to the present disclosure advantageously includes an optical unit for imaging the light emitted by the at least one light wavelength conversion element. This optical unit enables imaging of the light distribution which is generated on the at least one light wavelength conversion element, on the roadway in front of the vehicle. Both the converted light emitted by the at least one light wavelength conversion element and the non-converted light may be imaged by means of this optical unit.

The illumination device according to the present disclosure is preferably designed as an integral part of a motor vehicle headlight which is used for generating one or multiple light distributions from the group including low-beam distribution, high-beam distribution, daytime running light distribution, position light distribution, turning light distribution, and fog light distribution. In addition, the illumination device according to the present disclosure may also provide for a cornering light function, or may be designed as an integral part of an adaptive front lighting system (AFS). Additional application areas of the illumination device according to the present disclosure include effects projectors for the entertainment industry, lamps for architectural lighting and for dynamic light shows, and the like.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which:

FIG. 6 shows a first light distribution which was generated by means of the illumination device according to the first exemplary embodiment on the surface of the light wavelength conversion element;

FIG. 7 shows a second light distribution which was generated by means of the illumination device according to the first exemplary embodiment on the surface of the light wavelength conversion element;

DETAILED DESCRIPTION

Figure 1:
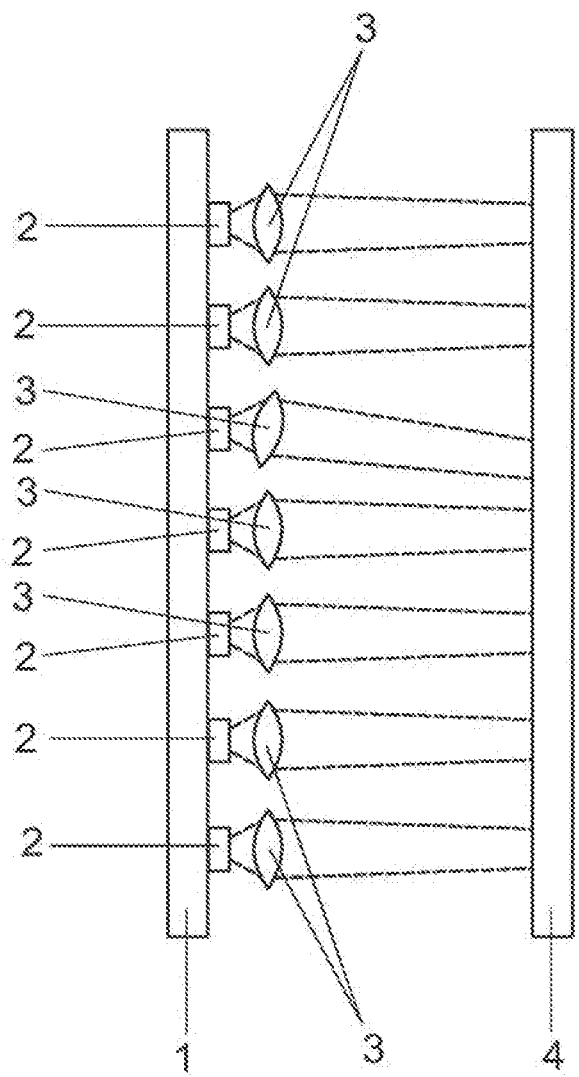
FIG. 1 shows a schematic representation of a side view of an illumination device according to the first exemplary embodiment of the present disclosure.
Figure 2:
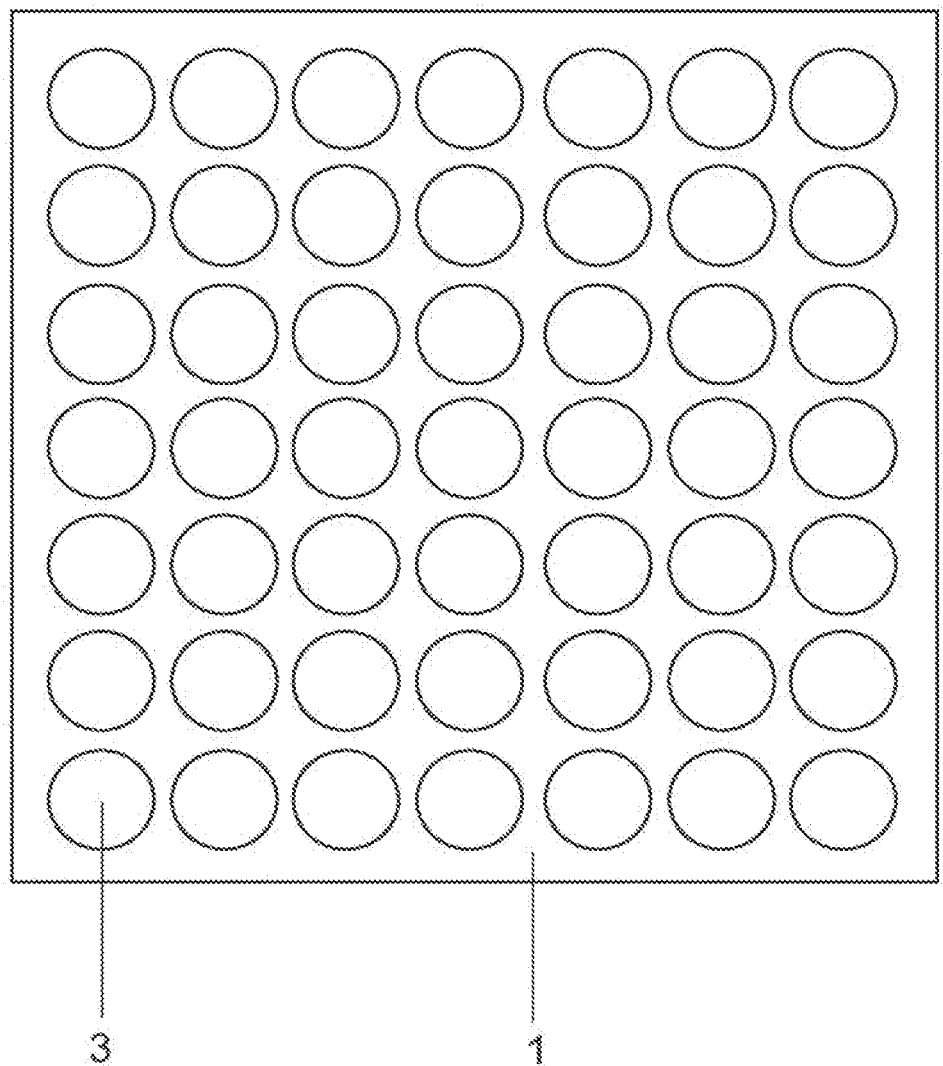
FIG. 2 shows a schematic representation of the top view of the illumination device depicted in FIG. 1.

The preferred exemplary embodiments of the present disclosure relate to illumination devices which are provided for use in a motor vehicle headlight in the front area of the motor vehicle, in order to generate light distributions for at least one of the illumination functions of low beam, high beam, daytime running light, fog light, turning light, AFS light, for example, freeway light, poor weather light, city light, marker light, etc., optionally including cornering light in each case, and position light.

The illumination device according to the first exemplary embodiment of the present disclosure has forty-nine laser diodes 2 which are arranged on a common carrier 1. The carrier 1 is designed as a semiconductor substrate and is made essentially of the same semiconductor material as the laser diodes 2. The carrier 1 contains metallic areas 6 which act as electrical contacts or electrical conductors, and metallic layers which are used for cooling. The laser diodes 2 are arranged on a surface of the carrier 1, spaced apart from each other by rows and by columns in seven rows and seven columns, thereby forming an array of laser diodes 2. An optical lens 3 is associated with each laser diode 2. In addition, the illumination device according to the first exemplary embodiment of the present disclosure includes forty-nine optical lenses 3 and one light wavelength conversion element 4. Exactly one of the optical lenses 3 is associated with each laser diode 2, and vice-versa. The optical lenses 3 are used to direct the light emitted by the laser diode 2 associated with it onto a surface of the light wavelength conversion element 4.

The laser diodes 2 are formed from the semiconductor material of the carrier 1 and are each made, in a known manner, of semiconductor layers having different doping of the semiconductor material. The laser diodes 2 are designed in such a way that during their operation, they each emit blue light having a wavelength from the wavelength range of 380 nanometers to 490 nanometers. The light emitted by the laser diodes 2 is also referred to below as primary light. The laser diodes 2 are each connected to an operating device 8 via metallic contacts and electrical conductors 80 arranged on the carrier 1. The operating device 8 includes a switching arrangement for current and voltage control for the laser diodes 2, and enables control of each individual laser diode 2. In particular, each laser diode 2 may be separately switched on and switched off by means of the operating device 8, and the brightness of each laser diode 2 may be controlled separately by means of the operating device 8.

The power supply of the operating device 8 and the overall illumination device takes place with the aid of electrical terminals 81, 82, which are connected to the vehicle electrical system voltage source of the motor vehicle.

Each optical lens 3 is supported by three columns 5 which are arranged on the surface of the carrier 1. The sections of the three columns 5 of an optical lens 3 connected to the carrier 1 define the corner points of an equilateral triangle on the surface of the carrier 1, in the center of which the laser diode 2 associated with the optical lens 3 is arranged. The columns 5 each contain three piezoelectric elements 51, 52 and 53 separated from each other via spacing elements, which enable movement of the optical lens 3 in all spatial directions, and tilting movements or pivoting movements of the optical lenses 3 supported by the columns 5. In particular, an optical lens 3 may be moved in a direction parallel to the surface of the carrier 1, in which the laser diodes 2 are arranged, with the aid of the three piezoelectric elements 51 which are arranged in the three columns 5 supporting the optical lens 3. In addition, this optical lens 3 may be moved in the direction which is perpendicular to the aforementioned direction of movement and parallel to the surface of the carrier 1, in which the laser diodes 2 are arranged, with the aid of the piezoelectric elements 52 which are arranged in the columns 5 supporting them. In other words, with the aid of the piezoelectric elements 51, 52, the optical lens 3 may be moved in all possible directions parallel to the surface of the carrier 1, in which the laser diodes 2 are arranged. In addition, this optical lens 3 may be moved perpendicular to the aforementioned surface of the carrier 1, with the aid of the three piezoelectric elements 53 which are arranged in the columns 5 supporting them. In particular, the spacing of the optical lens 3 from the carrier 1, and thus from the laser diode 2 which is associated with it, may be changed with the aid of the piezoelectric elements 53. In addition, the optical lens 3 may be tilted or pivoted by varying the control of the three piezoelectric elements 53 which are arranged in the three columns 5 supporting the optical lens 3, wherein the pivot axis lies in a plane parallel to the surface of the carrier 1, in which the laser diodes 2 are arranged. The control of the piezoelectric elements 51, 52, 53 in the columns 5 is carried out with the aid of a control unit 7 which is connected to all piezoelectric elements 51, 52, 53 via electrical conductors 70 and metallic contacts 6 on the carrier 1. A control line 83 between the control unit 7 and the operating device 8 enables control of the piezoelectric elements 51, 52, 53 in the columns 5 carrying them, for each optical lens, as a function of the operating state of the laser diode 2 which is associated with the optical lens 3.

Figure 3:
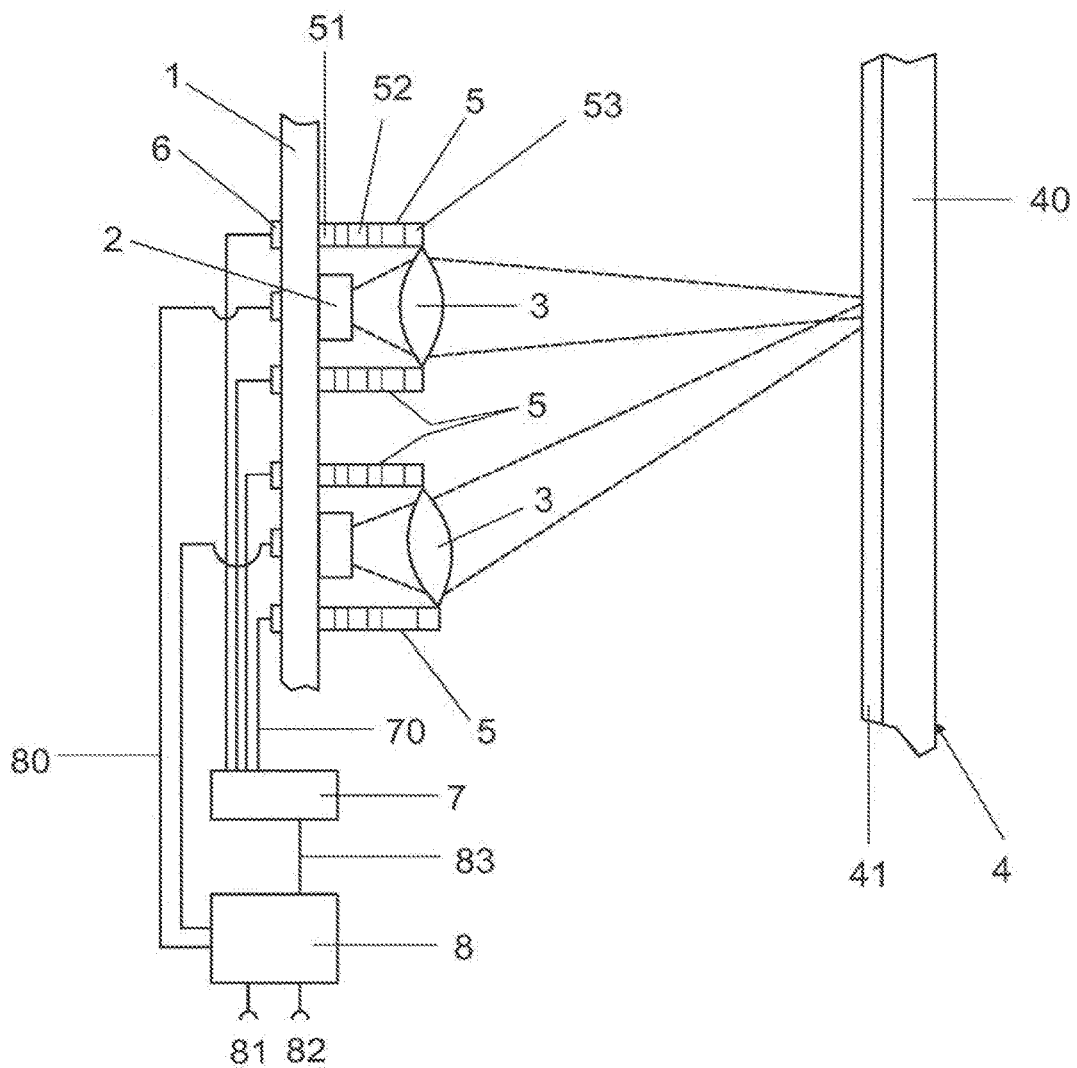
FIG. 3 shows an enlarged schematic representation of a portion of the illumination device depicted in FIGS. 1 and 2.

FIG. 3 schematically depicts a portion of the illumination device according to the first exemplary embodiment of the present disclosure, including only two of the laser diodes 2 and the optical elements 3 associated with them. One of the two optical lenses 3 is inclined in its three supports 5 by means of the piezoelectric elements 53, so that the light beams emitted by the laser diodes 2 are directed onto the same surface section of the light wavelength conversion element 4 by means of the optical lenses 3 associated with them.

The optical lenses 3 are made of glass or transparent silicon or transparent plastic. According to the exemplary embodiments of the illumination device according to the present disclosure depicted in the figures, the optical lenses 3 are designed as convex optical lenses 3 which reduce the divergence of the light beams emitted by the laser diodes 2. Alternatively, the optical lenses 3, for example, may also be designed as concave optical lenses which increase the divergence of the light beams emitted by the laser diodes 2, in order to achieve a larger laser spot on the light wavelength conversion element 4. In addition, the optical lenses 3 may have any other shapes in order to obtain the desired light distribution on the light wavelength conversion element 4. For example, the lenses 3 may also be designed asymmetrically with respect to rotation about their optical axis.

The light wavelength conversion element 4 of the illumination device according to the first exemplary embodiment of the present disclosure is made up of a translucent sapphire plate 40 which is coated with phosphor 41 on one surface. Cerium-doped yttrium aluminum garnet (YAG:Ce) is used as a phosphor 41. The surface of the sapphire plate 40 coated with phosphor 41 faces the carrier 1 for the laser diodes 2 and the optical lenses 3. Alternatively, the surface of the sapphire plate 40 coated with phosphor 41 may face away from the carrier 1 for the light-emitting diodes 2 and the optical lenses 3. The primary light emitted by the laser diodes 2 is directed onto the phosphor 41 of the light wavelength conversion element 4 by means of the optical lenses 3 and, with the aid of the phosphor 41, is converted proportionately into light having another wavelength, which is also referred to below as secondary light. The secondary light generated by the phosphor 41 has a maximum intensity in the wavelength range of 500 nanometers to 600 nanometers. As a result, the light wavelength conversion element 4 radiates white light, which is a mixture of non-converted primary light and secondary light generated by the phosphor 41, on its side facing away from the phosphor 41. The relative proportion of secondary light and non-converted primary light in the white light radiated by the light wavelength conversion element 4 is a function of the layer thickness of the phosphor 41 on the sapphire plate 40.

Figure 8:
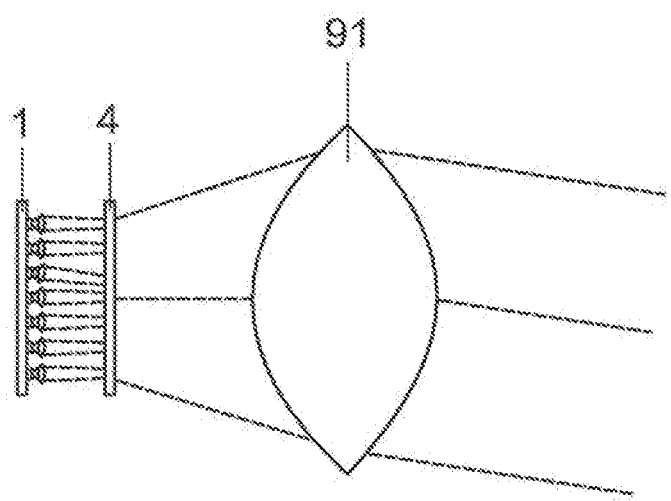
FIG. 8 shows a schematic representation of a side view of an illumination device according to the second exemplary embodiment of the present disclosure.

FIG. 8 schematically depicts an illumination device according to the second exemplary embodiment of the present disclosure. This illumination device differs from the illumination device according to the first exemplary embodiment only through an additional refractive secondary optical unit 91, which projects the light radiated by the light wavelength conversion element 4 onto the roadway of the vehicle. The illumination devices according to the first and second exemplary embodiments of the present disclosure correspond in all other details. Therefore, in FIGS. 1 to 8, identical components of the illumination devices of both exemplary embodiments are referred to using the same reference numerals, and for describing them, reference is made to the description of the first exemplary embodiment. In the case of the imaging of the light-radiating surface of the light wavelength conversion element 4 by the refractive secondary optical unit 91, the shape of the light distribution which is generated on the surface of the light wavelength conversion element 4 with the aid of the primary light and the optical lenses 3, is maintained. The secondary optical unit 91 projects the light distribution generated on the wavelength conversion element 4 by means of primary light and optical lenses 3 into the distant field in front of the vehicle, wherein the primary light is proportionately converted into secondary light by means of the phosphor 41.

Figure 9:
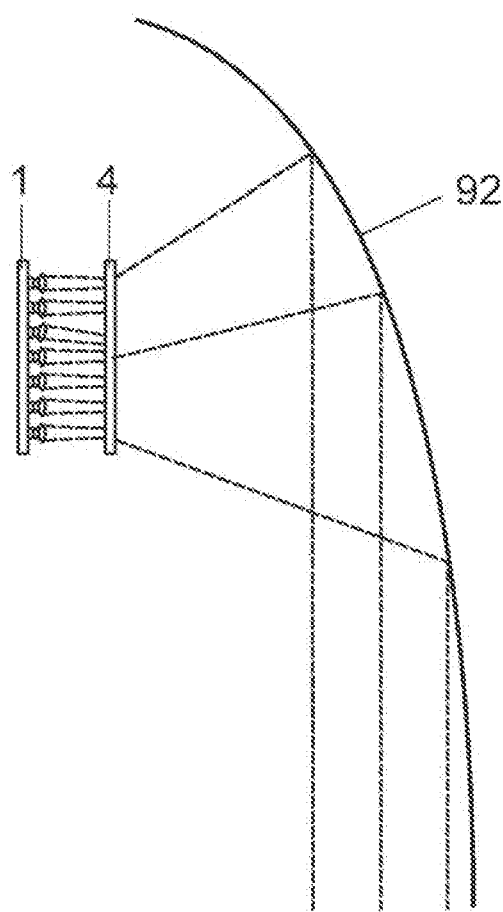
FIG. 9 shows a schematic representation of an illumination device according to the third exemplary embodiment of the present disclosure.

FIG. 9 schematically depicts an illumination device according to the third exemplary embodiment of the present disclosure. This illumination device differs from the illumination device according to the first exemplary embodiment only through an additional secondary optical unit 92 designed as a reflector, which reflects the light radiated by the light wavelength conversion element 4 onto the roadway in front of the vehicle. The illumination devices according to the first and third exemplary embodiments of the present disclosure correspond in all other details. Therefore, in FIGS. 1 to 8, identical components of the illumination devices of both exemplary embodiments are referred to using the same reference numerals, and for describing them, reference is made to the description of the first exemplary embodiment. The reflector 92 reflects the light distribution generated on the light wavelength conversion element 4 by means of the primary light and the optical lenses 3 onto the roadway in front of the vehicle, wherein the primary light is proportionately converted into secondary light by the phosphor 41.

Figure 4:
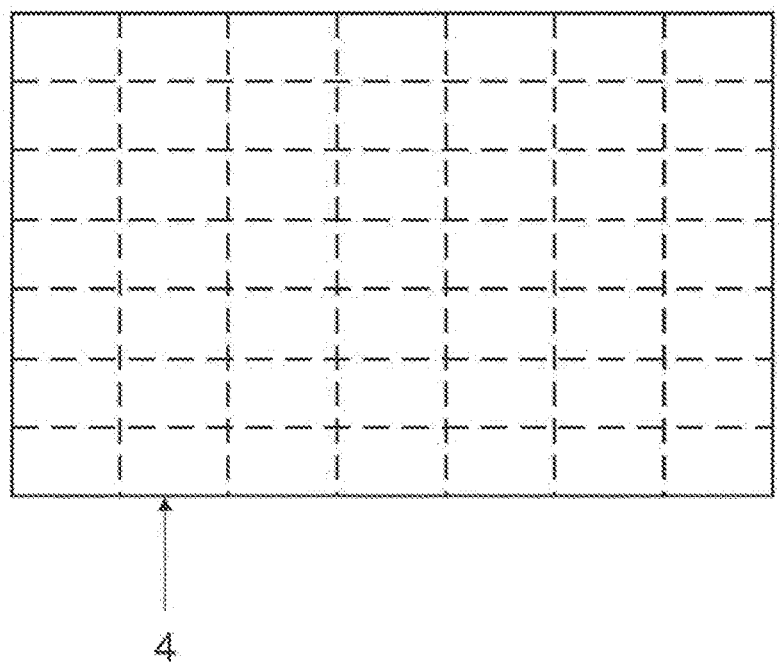
FIG. 4 shows a schematic representation of a top view onto a surface of the light wavelength conversion element of the illumination device in FIGS. 1 to 3.

FIG. 4 schematically depicts the surface, which is coated with phosphor 41, of the sapphire plate 40 of the light wavelength conversion element 4. According to the preferred exemplary embodiments of the illumination device according to the present disclosure, the sapphire plate 40, and thus the light wavelength conversion element 4, has a rectangular shape. The surface of the sapphire plate 40 or of the light wavelength conversion element 4, which is coated with phosphor 41, is designed as a single piece, in a homogeneous and unstructured manner. FIG. 4 depicts a first light distribution by way of example with the aid of dashed lines, which is generated on the surface of the light wavelength conversion element 4, which is coated with phosphor 41, by means of the primary light emitted by the laser diodes 2 and the optical lenses 3 associated with them.

In the light distribution depicted in FIG. 4, the surface of the light wavelength conversion element 4, which is coated with phosphor 41, is illuminated evenly, i.e., at the same intensity, with primary light, wherein each of the forty-nine laser diodes 2 illuminates, by means of the optical lens 3 which is associated with it, exactly one of the zones, which are depicted by the dashed lines, of the surface of the light wavelength conversion element 4, which is coated with phosphor 41.

Figure 5:
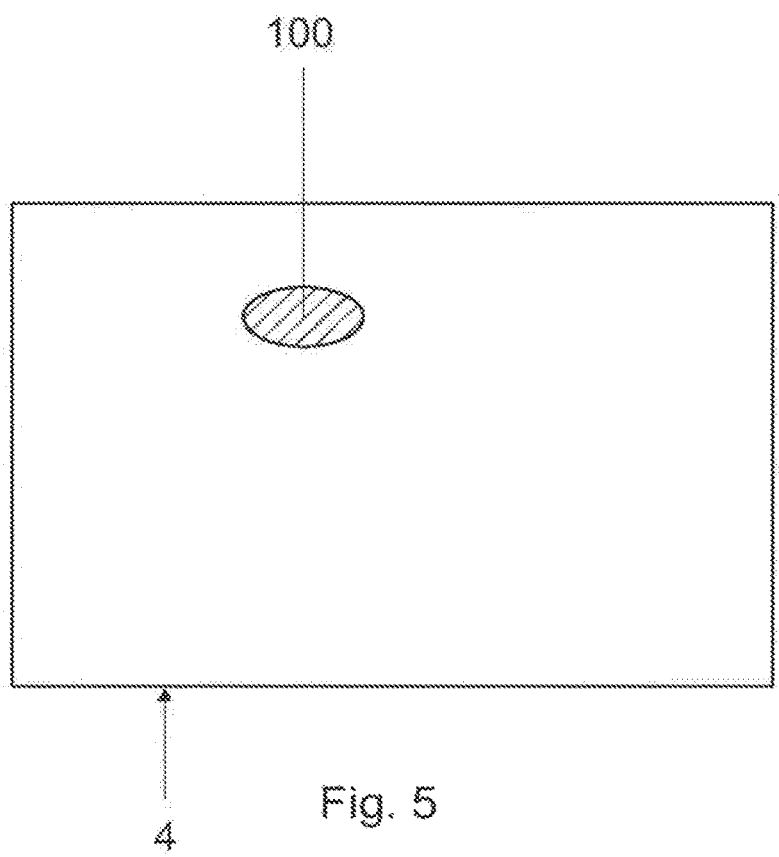
FIG. 5 shows a schematic representation of a top view onto a surface of the light wavelength conversion element of the illumination device depicted in FIGS. 1 to 3, including a depiction of a laser spot.

FIG. 5 schematically depicts a laser spot 100 on the surface of the light wavelength conversion element 4, which is coated with phosphor 41. The laser spot 100 is generated with the aid of the laser diode 2 which is arranged in the second row and the third row of the field of laser diodes 2, and with the aid of the optical lens 3 associated with this laser diode 2. According to the preferred exemplary embodiments of the illumination device according to the present disclosure, the laser diodes 2 and the optical lenses 3 associated with them are designed in such a way that they generate laser spots having an elliptical contour on the surface of the light wavelength conversion element 4, which is coated with phosphor 41. The size and the position of the laser spot 100 on the surface of the light wavelength conversion element 4, which is coated with phosphor 41, is varied with the aid of the piezoelectric elements 51, 52, 53 and the control unit 7.

FIGS. 6 and 7 schematically depict, by way of example, two further light distributions on the surface of the light wavelength conversion element 4, which is coated with phosphor 41, which are generated with the aid of the laser diodes 2 arranged in rows and columns, and the optical lenses 3 which are associated with them. The zones of the surface of the light wavelength conversion element 4, which is coated with phosphor 41, which are indicated by the letter A, are illuminated with primary light which is generated by only one laser diode 2 in each case, and which is directed onto the light wavelength conversion element 4 by means of the optical lens 3 which is associated with it. The zones of the surface of the light wavelength conversion element 4, which is coated with phosphor 41, which are indicated by the letter B, are illuminated with primary light which is generated by two laser diodes 2 in each case, and which is directed onto the light wavelength conversion element 4 by means of the optical lens 3 which are associated with them. The zones of the surface of the light wavelength conversion element 4, which is coated with phosphor 41, which are indicated by the letter C, are illuminated with primary light which is generated by three laser diodes 2 in each case, and which is directed onto the light wavelength conversion element 4 by means of the optical lens 3 which are associated with them, and the unlabeled zones of the surface of the light wavelength conversion element 4, which is coated with phosphor 41, are not illuminated with primary light. The depiction of the light distributions in FIGS. 6 and 7 is merely schematic. In practice, the intensity profile or the positions and size of the laser spots are set in such a way that a continuous transition between the different areas is achieved.

The illumination of the aforementioned zones is carried out with the aid of the piezoelectric elements 51, 52, 53, which move the optical lenses 3 relative to the laser diode 2 and the light wavelength conversion element 4 which are associated with them, as a function of control commands which are transmitted from the control unit 7 to the piezoelectric elements 51, 52, 53, in such a way that the aforementioned zones of the surface of the light wavelength conversion element 4, which is coated with phosphor 41, are illuminated with primary light from one or multiple laser diodes 2, or are not illuminated at all.

In addition, with the aid of the operating device 8, the brightness of the light emitted by all or by individual laser diodes 2 may be varied during the switchover between two light distributions. For example, during the switchover from a daylight running light distribution to a position light distribution, the brightness of the light emitted by all laser diodes 2 may be reduced to a certain level, and during the switchover from the position light distribution to the daytime running light distribution, it may be controlled to a higher level.

The essentially symmetrical light distribution depicted in FIG. 6 corresponds, for example, to a high-beam light distribution, which is imaged onto the roadway in front of the vehicle by means of the secondary optical unit 91 or 92.

The unsymmetrical light distribution depicted in FIG. 7 corresponds, for example, to a high-beam light distribution having a superimposed cornering light distribution during a right turn of the vehicle, wherein the zone in the second column and the second and third columns is not illuminated, in order, for example, to prevent the dazzling of an oncoming vehicle or a pedestrian.

The switchover between the light distributions depicted in FIGS. 6 and 7, as well as possibly other light distributions, takes place in the illumination device according to the preferred exemplary embodiments with the aid of the movable optical lenses 3 via the control unit 7 and the piezoelectric elements 51, 52, 53.

The light distributions generated on the surface of the light wavelength conversion element 4, which is coated with phosphor 41, are possibly imaged by the secondary optical unit 91, 92 having transposed sides and transposition of the top and bottom onto the roadway in front of the vehicle.

The present disclosure is not limited to the exemplary embodiments of the present disclosure described above in greater detail. For example, the optical lenses 3 may be moved not only for switching between the light distributions; for example, for generating a light distribution, it is also possible to allow the optical lenses 3 to oscillate about a resting position by means of the piezoelectric elements in order to ensure a more homogeneous illumination of the light wavelength conversion element 4 and possibly to avoid dark strips between zones which are illuminated by different laser diodes 2.

In addition, instead of piezoelectric elements, step motors may also be used for moving the optical lenses. Furthermore, it is possible to change the contour of the laser beam profile of the laser diodes 2 and the shape of the light wavelength conversion element 4 for the purpose of adjusting to the desired application. In addition, the number of laser diodes 2 and optical lenses 3 may also be changed. For example, a common movable optical lens may be provided for multiple laser diodes, so that light of multiple laser diodes is directed onto the light wavelength conversion element via a common movable optical lens. Likewise, multiple components may be grouped, so that, for example, multiple lenses may only be moved together in front of their associated laser diodes. Furthermore, it is also possible that only one, or only a portion, of the optical lenses 3 is movably arranged.

The optical lenses 3 may also be replaced by an optical unit made up of multiple optical elements, for example, in order to minimize imaging errors.

Groups of laser diodes 2 may also be formed, for example, all laser diodes 2 of a row, or all laser diodes of a column, with which a common, pivotable optical unit is associated.

The phosphor element 4 may be made up of areas having a different phosphor combination. Individual areas of the phosphor element 4 may have identical or different layer thickness.

The laser diode 2 may emit identical or different wavelengths.

The lateral dimensions of the phosphor areas A, B, and C depicted in FIGS. 6 and 7 may be formed differently. Thus, for example, phosphor areas lying in the center of the phosphor element 4 may have a smaller vertical dimension, with the result that the rows formed by these phosphor areas are formed more narrowly. The lateral dimensions of the respective phosphor areas may be correspondingly adjusted or modulated dynamically to the conditions.

It is possible to combine multiple light sources and associated optical units into subunits (mechanically or electronically, or mechanically and electronically), and to permanently or temporarily move their spots synchronously on the conversion colorant. In the case of a temporary, synchronous movement, the combination into a subunit may take place electronically only for the duration of the synchronization.

The present disclosure is not limited to the distribution of the illumination areas on the conversion colorant shown in FIG. 4. Other shapes, shape factors, and distributions, in particular, different ones of the brightness distributions within the illumination areas, are possible.

In the case of the exemplary embodiments of the illumination device according to the present disclosure described above, the light wavelength conversion element 4 is operated in transmission, i.e., primary light and secondary light permeate the sapphire plate 40 of the light wavelength conversion element 4, and the primary light permeating the sapphire plate 40 is used for the imaging via the secondary optical unit 91, 92. Alternatively, the light wavelength conversion element 4 could have a light-reflecting carrier for the phosphor 41 instead of the sapphire plate 40, and the primary light and secondary light reflected at the light-reflecting carrier could be directed onto the roadway in front of the vehicle by means of suitable secondary optical units, for example, by means of a reflector or a combination of multiple reflectors.

Alternatively, in the case of the reflective phosphor arrangement, a refractive secondary optical unit could also be used.

The invention claimed is:

1. An illumination device for vehicles comprising:
multiple laser diodes arranged on a common carrier,
at least one light wavelength conversion element for the wavelength conversion of
the light emitted by the multiple laser diodes,
the at least one light wavelength conversion element comprising a surface coated with a phosphor which is illuminable with light generated by the multiple laser diodes,
wherein at least one light-refracting optical unit is associated with each laser diode, wherein the at least one light-refracting optical unit is arranged on the common carrier and is configured to direct light emitted by the respective laser diode onto the at least one light wavelength conversion element,
wherein the at least one light-refracting optical unit is movably arranged with respect to the laser diode with which it is associated;
a movement device comprising a plurality of columns connected to the common carrier, the plurality of columns supporting the at least one light-refracting optical units,
wherein each column comprises at least one piezoelectric element configured to move the at least one light-refracting optical unit; and
a control unit for the movement device,
wherein the at least one light-refracting optical unit is movably arranged with respect to the laser diode with which it is associated, such that a zone of the surface coated with the phosphor is illuminable with light generated by more than one of the multiple laser diodes.

2. The illumination device as claimed in claim 1, wherein the at least one light-refracting optical unit is designed to be pivotable, slidable, or rotatable, or pivotable and slidable, or pivotable and rotatable, or slidable and rotatable, or pivotable and slidable and rotatable.

3. The illumination device as claimed in claim 1, wherein the illumination device further comprises an operating device for operating the multiple laser diodes.

4. The illumination device as claimed in claim 1, wherein an optical unit is provided for imaging the light emitted by the at least one light wavelength conversion element.

5. A motor vehicle headlight comprising at least one illumination device,
the illumination device comprising:
multiple laser diodes arranged on a common carrier,
at least one light wavelength conversion element for the wavelength conversion of the light emitted by the multiple laser diodes,
the at least one light wavelength conversion element comprising a surface coated with a phosphor which is illuminable with light generated by the multiple laser diodes,
wherein at least one light-refracting optical unit is associated with each laser diodes, wherein the at least one light-refracting optical unit is arranged on the common carrier and is configured to direct light emitted by the respective laser diode onto the at least one light wavelength conversion element,
wherein the at least one light-refracting optical unit is movably arranged with respect to the laser diode with which it is associated;
a movement device comprising a plurality of columns connected to the common carrier, the plurality of columns supporting the at least one light-refracting optical units,
wherein each column comprises at least one piezoelectric element configured to move the at least one light-refracting optical unit; and
a control unit for the movement device,
wherein the at least one light-refracting optical unit is movably arranged with respect to the laser diode with which it is associated, such that a zone of the surface coated with the phosphor is illuminable with light generated by more than one of the multiple laser diodes.

* * * * *